US009328280B2

(12) United States Patent
Bishop et al.

(10) Patent No.: US 9,328,280 B2
(45) Date of Patent: May 3, 2016

(54) ADDITIVES FOR OIL-BASED DRILLING FLUIDS

(71) Applicant: Chevron Phillips Chemical Company LP, The Woodlands, TX (US)

(72) Inventors: Marshall D. Bishop, Bartlesville, OK (US); Willie P. Reneau, Tomball, TX (US); Frank E. Evans, Bartlesville, OK (US); John E. Anderson, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/889,940

(22) Filed: May 8, 2013

(65) Prior Publication Data

US 2014/0336085 A1 Nov. 13, 2014

(51) Int. Cl.
*C09K 8/34* (2006.01)
*C09K 8/035* (2006.01)
*C09K 8/36* (2006.01)

(52) U.S. Cl.
CPC . *C09K 8/34* (2013.01); *C09K 8/035* (2013.01); *C09K 8/36* (2013.01); *Y10T 428/2982* (2015.01)

(58) Field of Classification Search
None
See application file for complete search history.

(56) References Cited

U.S. PATENT DOCUMENTS

| 3,028,333 | A | * | 4/1962 | Stratton et al. | 507/113 |
|---|---|---|---|---|---|
| 3,070,165 | A | | 12/1962 | Stratton | |
| 3,089,842 | A | * | 5/1963 | Stratton | 208/44 |
| 4,519,922 | A | | 5/1985 | Sutton et al. | |
| 4,584,327 | A | | 4/1986 | Sutton | |
| 4,618,433 | A | * | 10/1986 | Allison, III | 507/109 |
| 4,741,868 | A | | 5/1988 | Rooney et al. | |
| 5,360,738 | A | | 11/1994 | Jones et al. | |
| 5,501,277 | A | | 3/1996 | Onan et al. | |
| 5,541,006 | A | | 7/1996 | Conley | |
| 5,697,046 | A | | 12/1997 | Conley | |
| 6,036,870 | A | * | 3/2000 | Briant et al. | 210/781 |
| 6,291,405 | B1 | | 9/2001 | Lee et al. | |
| 6,514,916 | B1 | | 2/2003 | Clampitt et al. | |
| 6,743,756 | B2 | | 6/2004 | Harris, Jr. | |
| 7,067,461 | B2 | | 6/2006 | Rayborn | |
| 7,169,738 | B2 | | 1/2007 | Massam et al. | |
| 7,176,165 | B2 | | 2/2007 | Massam et al. | |

(Continued)

FOREIGN PATENT DOCUMENTS

| EP | 0119745 A2 | 9/1984 |
|---|---|---|
| GB | 2055412 A | 3/1981 |
| WO | 2012101456 A1 | 8/2012 |
| WO | 2014055402 A1 | 4/2014 |
| WO | 2014182375 A1 | 11/2014 |

OTHER PUBLICATIONS

Foreign communication from a related counterpart application—International Search Report and Written Opinion, PCT/US2014/031049, Jun. 16, 2014, 10 pages.

(Continued)

*Primary Examiner* — Alicia Bland
(74) *Attorney, Agent, or Firm* — Conley Rose, P.C.; Rodney B. Carroll; Monte R. Rhodes

(57) ABSTRACT

An additive for a wellbore treatment fluid comprising a sulfonated asphalt compound comprising particles having a D90 particle size of less than about 215 μm. A wellbore treatment fluid comprising (i) an oleaginous component and (ii) a sulfonated asphalt wherein the sulfonated asphalt comprises particles having a D90 of less than about 215 μm.

26 Claims, 3 Drawing Sheets

(56) References Cited

U.S. PATENT DOCUMENTS

| | | | |
|---|---|---|---|
| 7,220,707 | B2 | 5/2007 | Massam et al. |
| 7,238,646 | B2 | 7/2007 | Thaemlitz et al. |
| 7,377,721 | B2 | 5/2008 | Patel |
| 7,409,994 | B2 | 8/2008 | Massam et al. |
| 7,438,758 | B2 | 10/2008 | Santra et al. |
| 7,449,062 | B2 | 11/2008 | Santra et al. |
| 7,488,705 | B2 | 2/2009 | Reddy et al. |
| 2004/0000434 | A1 | 1/2004 | Todd et al. |
| 2004/0094300 | A1* | 5/2004 | Sullivan et al. ............ 166/308.1 |
| 2007/0265172 | A1* | 11/2007 | Patel et al. .................... 507/221 |
| 2008/0085841 | A1* | 4/2008 | Brown .......................... 507/104 |
| 2009/0029878 | A1 | 1/2009 | Bicerano |
| 2011/0017600 | A1 | 1/2011 | Larson |
| 2011/0017675 | A1 | 1/2011 | Larson |
| 2011/0056748 | A1* | 3/2011 | Browne et al. .................... 175/5 |
| 2011/0254553 | A1* | 10/2011 | van Zanten .................. 324/366 |
| 2012/0073813 | A1 | 3/2012 | Zamora et al. |
| 2014/0094394 | A1 | 4/2014 | Bishop et al. |

OTHER PUBLICATIONS

Foreign communication from a related counterpart application—International Search Report and Written Opinion, PCT/US2013/062595, Jan. 22, 2014, 11 pages.

Foreign communication from a related counterpart application—International Preliminary Report on Patentability, PCT/US2013/062595, Apr. 7, 2015, 8 pages.

Office Action dated Jan. 29, 2015 (16 pages), U.S. Appl. No. 13/633,631, filed Oct. 2, 2012.

Office Action (Final) dated May 7, 2015 (8 pages), U.S. Appl. No. 13/633,631, filed Oct. 2, 2012.

Advisory Action dated Jun. 5, 2015 (4 pages), U.S. Appl. No. 13/633,631, filed Oct. 2, 2012.

Office Action dated Jun. 22, 2015 (11 pages), U.S. Appl. No. 13/633,631, filed Oct. 2, 2012.

"The Mineral Wolframite," retrieved from Internet Archive Wayback Machine, http://web.archive.org/web/20111208175538/http://www.galleries.com/Wolframite, Dec. 8, 2011, 3 pages.

Foreign communication from a related counterpart application—International Preliminary Report on Patentability, PCT/US2014/031049, Nov. 10, 2015, 7 pages.

Office Action (Final) dated Sep. 4, 2015 (13 pages), U.S. Appl. No. 13/633,631, filed Oct. 2, 2012.

Advisory Action dated Nov. 16, 2015 (3 pages), U.S. Appl. No. 13/633,631, filed Oct. 2, 2012.

Office Action dated Feb. 16, 2016 (12 pages), U.S. Appl. No. 13/633,631, filed Oct. 2, 2012.

\* cited by examiner

ADDITIVES FOR OIL-BASED DRILLING FLUIDS

TECHNICAL FIELD

This disclosure relates to servicing an oil field. More specifically, this disclosure relates to wellbore treatment fluids and methods of making and using same.

BACKGROUND

Subterranean deposits of natural resources such as gas, water, and crude oil are commonly recovered by drilling wells to tap subterranean formations or zones containing such deposits. Various fluids are employed in drilling a well and preparing the well and an adjacent subterranean formation for the recovery of material therefrom. For example, a drilling fluid or mud is usually circulated through a wellbore as it is being drilled to cool the bit, keep deposits confined to their respective formations during the drilling process, and bring drill cuttings to the surface.

One challenge to the recovery of natural resources from subterranean formations is the permeability of the formation in which these deposits reside. Particularly due to the presence of permeable zones, at least a portion of the fluids introduced to the subterranean formation during a wellbore servicing operation may be lost to the permeable zones of the formation. The loss of these wellbore servicing fluids to the subterranean formation can present a variety of challenges such as the cost of replacing the lost wellbore servicing fluids; the impact of the wellbore servicing fluids on the formation surrounding the wellbore; and the potential loss of function provided by the presence of a less than process-desired amount of fluid in the wellbore. Therefore, an ongoing need exists for materials to reduce the loss of wellbore servicing fluids to the surrounding formation.

SUMMARY

Disclosed herein is an additive for a wellbore treatment fluid comprising a sulfonated asphalt compound comprising particles having a D90 particle size of less than about 215 µm.

Also disclosed herein is a wellbore treatment fluid comprising (i) an oleaginous component and (ii) a sulfonated asphalt wherein the sulfonated asphalt comprises particles having a D90 of less than about 215 µm.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
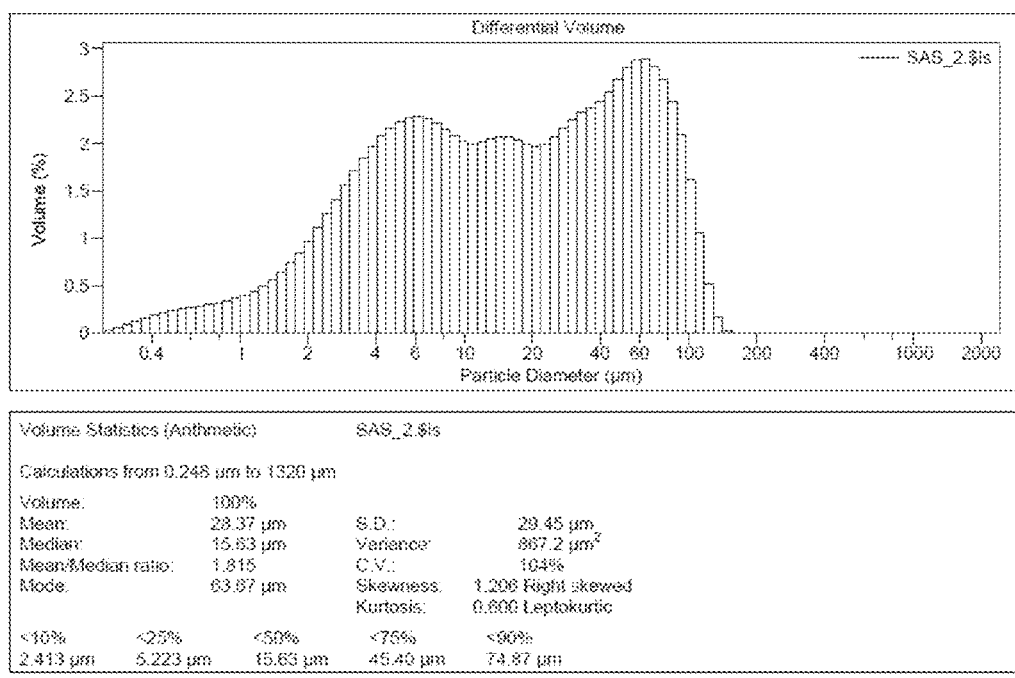
FIG. 1 shows the D90, D50, and D10 particle size distributions for the ground asphaltic materials in the samples from Example 1 and Example 2.

Disclosed herein are additives comprising ground sulfonated asphalt (GSA). In an embodiment, the GSA has particle size parameters that facilitate its incorporation into wellbore treatment fluids containing a nonaqueous component. As used herein, a "wellbore treatment fluid" (WTF) refers to a fluid that may be used to prepare a wellbore and/or a subterranean formation penetrated by the wellbore for the recovery of material from the formation, for the deposit of material into the formation, or both. It is to be understood that the WTF may be utilized in any operation designed to recover a natural resource from the formation and is not limited to the recovery of oil. In an embodiment, the GSA when incorporated into a WTF may provide multiple functionalities including but not limited to (i) fluid loss reduction, (ii) shale stabilization (iii) rheology modification or (iv) combinations thereof. These and other aspects of this disclosure are disclosed in more detail herein.

Herein, the term "asphalt" or "asphaltic material" refers to dark brown to black semi-solid or solid cementitious hydrocarbon materials which are completely or substantially soluble in carbon disulfide and in which bitumens are the sole or predominant constituent. Asphalt occurs in nature or may be obtained by refining petroleum by distillation, precipitation, cracking, oxidation or similar operations. Asphaltic materials suitable for use in the present disclosure include without limitation asphaltenes, maltenes, blown asphalt, straight residual oils, distillation residues, still bottoms, cracking residues, asphaltic bitumens, or combinations thereof.

In an embodiment, the GSA may be characterized by ring and ball softening points in the range of about 115° F. to 475° F., or alternatively from about 315° F. to about 350° F. The ring and ball softening point refers to a method of determining the softening point of the asphalt. Generally for the ring and ball softening test a specimen is cast or molded inside a ring of metal with dimensions 15.875 mm inside diameter by 2.38 mm thick by 6.35 mm deep. This ring is placed above a metal plate in a fluid heating bath, and a 9.5 mm diameter steel ball weighing 3.5 grams is placed in the center of the specimen. The softening point is considered to be the temperature of the fluid when the ball penetrates the specimen and touches the lower plate. In an embodiment, an asphalt suitable for use in the present disclosure may be characterized as having from about 0 to about 10 weight percent (wt. %) saturates based on the total weight of the materials, about 35 wt. % maximum resins, from about 30 wt. % to about 40 wt. % aromatics and from about 20 wt. % to about 30 wt. % asphaltenes.

The term "sulfonated asphalt" as herein employed is intended to cover an asphalt that has been sulfonated with a sulfonation agent. Examples of sulfonation agents include without limitation fuming sulfuric acid, chlorosulfonic acid, concentrated sulfuric acid, sulfur trioxide or combinations thereof. Sulfonated asphalts are generally produced by mixing an asphaltic material, of the typed disclosed herein, with a solvent (e.g., hexane) to form a mixture which is subsequently contacted with the sulfonation agent. After the sulfonation process, the asphalt-sulfonic acid formed may be neutralized with a basic compound (e.g., sodium hydroxide)

followed by separation from the solvent. As will be understood by one of ordinary skill in the art, the term "sulfonated asphalt" refers to a mixture of materials. This is due to the sulfonation process itself and the fact that the degree of sulfonation may vary depending on the type of sulfonating agent utilized.

In an embodiment, a sulfonated asphalt suitable for use in the present disclosure comprises the sodium or potassium salt of a sulfonated asphalt. Alternatively, the sulfonated asphalt may comprise a calcium or lithium salt. Alternatively, the sulfonated asphalt is the free acid.

GSA particles suitable for use in the present disclosure may be of any suitable shape. For example, the GSA particles may be cylindrical, discoidal, spherical, tabular, ellipsoidal, equant, irregular or combinations thereof.

In an embodiment, the GSA may be characterized by a mean particle size of from about 10 microns to about 100 microns, alternatively from about 10 microns to about 50 microns, or alternatively from about 10 microns to about 30 microns and a median particle size of from about 10 microns to about 100 microns, alternatively from about 10 microns to about 50 microns, or alternatively from about 10 microns to about 20 microns.

In an embodiment, a GSA suitable for use in the present disclosure has a particle size distribution wherein the D10 is less than about 30 microns, alternatively less than about 20 microns, or alternatively less than about 10 microns; the D50 is less than about 50 microns, alternatively less than about 30 microns, or alternatively less than about 20 microns; the D90 is less than about 215 microns, alternatively less than about 150 microns, or alternatively less than about 100 microns. The D50 refers to the median particle size while the D10 and D90 refer to the cumulative undersize distribution which notes the percentage of particles (i.e., 10% or 90%) having sizes at or below the indicated value. The D10, D50, D90, may be determined by standard particle size measurements such as physically sifting the material and measuring the mass of each fraction and calculating that fraction as a percentage of the total.

In an embodiment, a GSA of the type disclosed herein has a particle size that is characterized by equal to or greater than about 95% of the particles being able to pass through a 70 mesh sieve. Alternatively greater than about 98% or alternatively about 100%. In an embodiment, a GSA of the type disclosed herein has a particle size that is characterized by equal to or greater than about 95% of the particles being able to pass through a 100 mesh sieve. Alternatively greater than about 98% or alternatively about 100%. In an embodiment, a GSA of the type disclosed herein has a particle size that is characterized by equal to or greater than about 95% of the particles being able to pass through a 170 mesh sieve. Alternatively greater than about 98% or alternatively about 100%.

In an embodiment, a GSA of the type disclosed herein may be incorporated into any suitable WTF. The WTF may be any fluid utilized in a wellbore servicing operation. Thus, the WTF may serve as, for example, a drilling fluid, a work-over fluid, a fracturing fluid, a completion fluid, or a sweeping fluid. In an embodiment, the WTF is a drilling fluid. Drilling fluids, also termed drilling muds, are used to maintain pressure, cool drill bits and lift cuttings from the holes. The WTF comprising GSA, both of the type disclosed herein may advantageously display (i) reduced fluid loss; (ii) an increased level of shale stabilization (iii) desirable rheology modification, or combinations thereof.

In an embodiment, the WTF is an oil-based mud comprising an oleaginous component. Alternatively the WTF comprises a water-in-oil emulsion, termed an invert emulsion, comprising an oleaginous continuous phase and a non-oleaginous discontinuous phase. In an embodiment, the oleaginous fluid comprises a natural or synthetic oil, diesel oil, mineral oil, hydrogenated olefins, unhydrogenated olefins, polyalpha olefins, linear and branched olefins, polydiorganosiloxanes, siloxanes, organosiloxanes, esters of fatty acids such as straight chain, branched and cyclical alkyl ethers of fatty acids, or combinations thereof. In an embodiment, the non-aqueous fluid is a synthetic hydrocarbon. Examples of synthetic hydrocarbons suitable for use in this disclosure include without limitation linear-α-olefins, polyalphaolefins (unhydrogenated or hydrogenated), internal olefins, esters, or combinations thereof.

The concentration of the oleaginous fluid should be sufficient so that an invert emulsion forms and may be less than about 98% by volume of the invert emulsion. In one embodiment, the amount of oleaginous fluid is from about 30% to about 95% by volume, alternatively about 40% to about 90% by volume of the invert emulsion.

The non-oleaginous fluid used in the formulation of a WTF of the type disclosed herein (e.g., invert emulsion fluid) may comprise any aqueous liquid. For example, the non-oleaginous liquid may comprise fresh water, sea water, a brine containing organic and/or inorganic dissolved salts, liquids containing water-miscible organic compounds or combinations thereof. The amount of the non-oleaginous fluid is typically less than the theoretical limit needed for forming an invert emulsion. Thus, in one embodiment, the amount of non-oleaginous fluid comprises less that about 70% by volume of the invert emulsion fluid or alternatively from about 1% to about 70% by volume of the invert emulsion fluid. In another embodiment, the non-oleaginous fluid comprises from about 5% to about 60% by volume of the invert emulsion fluid.

In an embodiment, the WTF is an invert emulsion and further comprises emulsifiers and emulsifier systems for stabilizing the emulsion. As used herein, emulsifier, emulsifying agent, and surfactant are used interchangeably. The emulsifying agent serves to lower the interfacial tension of the liquids so that the non-oleaginous liquid may form a stable dispersion of fine droplets in the oleaginous liquid. Emulsifiers that may be used in the fluids disclosed herein include, for example, fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Additionally, the fluid may also contain surfactants that may be characterized as wetting agents. Wetting agents that may be suitable for use in the fluids disclosed herein include crude tall oil, oxidized crude tall oil, organic phosphate esters, modified imidazolines and amidoamines, alkyl aromatic sulfates and sulfonates, and the like, and combinations or derivatives of these.

In an embodiment, the WTF comprises a reversible invert emulsion, whereby the invert emulsion may be converted from a water-in-oil type emulsion to an oil-in-water type emulsion upon exposure to a conversion agent (e.g., acid). Such reversible oil-based fluids include those described in U.S. Pat. Nos. 7,238,646 and 7,377,721, each of which is herein incorporated by reference in their entirety.

In some embodiments, the WTF may comprise additional additives as deemed appropriate by one skilled in the art for improving the properties of the fluid. Such additives may vary depending on the intended use of the fluid in the wellbore. In an embodiment, the WTF is a cement slurry of the type disclosed herein and may include additives such as weighting agents, fluid loss agents, glass fibers, carbon fibers, hollow glass beads, ceramic beads, suspending agents, conditioning agents, retarders, dispersants, water softeners, oxidation and corrosion inhibitors, bactericides, thinners, and the like. In an embodiment, the WTF is a drilling fluid of the type disclosed herein and may include clays, organic polymers, viscosifiers, scale inhibitors, fluid loss additives, friction reducers, thinners, dispersants, temperature stability agents, pH-control additives, calcium reducers, shale control materials, emulsifiers, surfactants, bactericides, defoamers, and the like. These additives may be included singularly or in combination. Any suitable methodology for introducing these additives and their effective amounts may be employed.

In an embodiment, the GSA is included in a WTF, both of the type disclosed herein, in an amount of from about 0.1 lbs/bbl to about 15 lbs/bbl, alternatively from about 4 lbs/bbl to about 12 lbs/bbl, alternatively from about 6 lbs/bbl to about 10 lbs/bbl or alternatively less than about 15 lbs/bbl.

In an embodiment, the WTF comprises an oil based mud having diesel oil, mineral oil, synthetic oil, kerosene, fuel oil, crude oil, an olefin, an organic ester, a linear paraffin, a branched paraffin, an acetal, or derivatives thereof as the oleaginous component present in an amount of greater than about 40 wt %; a brine comprising $CaCl_2$, NaCl, other Group 1 and Group 2 chloride or formate salts, or Zn salts as the nonoleaginous component present in an amount less than about 60 wt %; and GSA present in an amount less than about 15 ppb, where the weight percent is based on the total weight of the WTF.

In an alternative embodiment, the WTF comprises an invert emulsion having diesel oil, mineral oil, synthetic oil, kerosene, fuel oil, crude oil, an olefin, an organic ester, a linear paraffin, a branched paraffin, an acetal, or derivatives thereof as the oleaginous component present in an amount greater than about 50 wt. %; a brine comprising $CaCl_2$, NaCl, other Group 1 and Group 2 chloride or formate salts, or Zn salts as the nonoleaginous component present in an amount less than about 50 wt. %; and GSA present in an amount less than about 15 ppb, where the weight percent is based on the total weight of the WTF.

In an embodiment, the WTF comprises a reversible invert emulsion having diesel oil, mineral oil, synthetic oil, kerosene, fuel oil, crude oil, an olefin, an organic ester, a linear paraffin, a branched paraffin, an acetal, or derivatives thereof as the oleaginous component present in an amount greater than about 70 wt. %; a brine comprising $CaCl_2$, NaCl, other Group 1 and Group 2 chloride or formate salts, or Zn salts as the nonoleaginous component present in an amount less than about 30 wt %; and GSA present in an amount less than about 15 ppb, where the weight percent is based on the total weight of the WTF.

In an embodiment, a WTF comprising a GSA, both of the type disclosed herein, may display a reduced amount of fluid loss as compared to the fluid loss observed with a comparable WTF without the GSA additive. For example, the WTF comprising a GSA may exhibit a fluid loss that is about 10% to about 90% less than the fluid loss observed in a comparable fluid without the GSA additive, alternatively from about 20% to about 80% less, or alternatively from about 30% to about 70% less. The fluid loss value may be determined using a standard high temperature high pressure (HTHP) fluid loss test, according to the specifications of the American Petroleum Institute (API), as described in "Recommended Practice Standard Procedure for Field Testing Oil-Based Drilling Fluids." The test employs a pressurized cell fitted with a standard hardened filter paper as a filtration medium. The filtration behavior of the drilling mud is determined with a standard pressure differential across the filter paper of 500 psi (3.45 MPa). A filter cake is allowed to build up on the filter paper for 30 minutes and the volume of filtrate collected after this 30 minute period is then recorded. Generally, the test temperature is in the range from about 50° C. to about 200° C.

In an embodiment, the WTF comprising a GSA, both of the type disclosed herein, may be characterized by a plastic viscosity of from about 1 cPs to about 75 cPs, alternatively from about 15 cPs to about 60 cPs, or alternatively from about 20 cPs to about 50 cPs; and a yield point of from about 1 $lb_f/100$ $ft^2$ to about 50 $lb_f/100$ $ft^2$, alternatively from about 1 $lb_f/100$ $ft^2$ to about 25 $lb_f/100$ $ft^2$, or alternatively from about 5 $lb_f/100$ $ft^2$ to about 20 $lb_f/100$ $ft^2$.

The plastic viscosity (PV) is an absolute flow property indicating the flow resistance of certain types of fluids and is a measure of shearing stress while the yield point (YP) refers to the resistance of the drilling fluid to initial flow, or represents the stress required to start fluid movement. Practically, the YP is related to the attractive force among colloidal particles in drilling mud. Gel Strength is a static measurement in that the measurement is determined after the fluids have been static for a defined time frame. During this time, a dynamic equilibrium based on diffusional interfacial interactions is reached which also determines the stability of the fluid or the ability to suspend cuttings. The plastic viscosity, yield point and gel strength may be determined by Fann 35 Rheometric analysis.

In an embodiment, the WTF is as a drilling fluid (e.g., OBM) which could be used in any suitable oil field operation occurring in a wellbore and/or subterranean formation. It is to be understood that "subterranean formation encompasses both area below exposed earth or areas below earth covered by water such as sea or ocean water. In particular, the drilling fluid comprising a GSA of the type disclosed herein can be displaced into a wellbore and used to service the wellbore in accordance with suitable procedures. For example, the drilling fluid can be circulated down through a hollow drill stem or a drill string and out through a drill bit attached thereto while rotating the drill stem to thereby drill the wellbore. The drilling fluid will flow back to the surface to carry drill cuttings to the surface, and deposit a filtercake on the walls of the wellbore. The thickness of the filtercake will be dependent on the nature of the formation and components of the drilling fluid. In an embodiment, the WTF is an OBM comprising a GSA both of the type disclosed herein. In such embodiments, the filtercake formed from the use of the WTF comprising a GSA of the type disclosed herein may be characterized by a reduction in thickness of equal to or greater than about 10%, alternatively a reduction in thickness of equal to or greater than about 50%, or alternatively a reduction in thickness of equal to or greater than about 90% as compared to a filtercake formed from a WTF that is an OBM not comprising a GSA of the type disclosed herein.

The GSA may be included in the drilling fluid prior to the fluid being placed downhole in a single stream embodiment. Alternatively, the GSA may be mixed with the other components of the drilling fluid during placement into the wellbore for example in a two-stream process wherein one stream comprises the GSA and a second stream comprises the other components of the drilling fluid. In an embodiment, the drilling fluid comprising the GSA is prepared at the wellsite. For example the GSA may be mixed with the other drilling fluid components and then placed downhole. Alternatively, the drilling fluid comprising the GSA is prepared offsite and transported to the use site before being placed downhole.

A WTF comprising a GSA, both of the type disclosed herein may advantageously display improved fluid loss properties, improved rheological properties, reduced torque, reduced gel strengths, and reduced drag. In such embodiments these properties may beneficially result in thinner, lighter filtercakes having a reduced potential for differential sticking. Such filtercakes may also beneficially reduce the loss of potentially damaging fluids to the formation.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

The general procedure utilized in the examples, unless otherwise indicated is as follows: A 14.0 pound per gallon (ppg) OBM having either an 80:20 oil-to-water ratio (OWR) or 81:19 OWR and 2 wt. % of a finely ground altered calcium montmorillonite clay used as a base mud. A suitable finely ground altered calcium montmorillinite clay is commercially available from Milwhite Inc. under the REV DUST brand. A 28 wt. % $CaCl_2$ brine was prepared and used as the aqueous component of the mud. Each component of the base fluid (i.e., OBM) was mixed with a 2-speed mixer for the indicated mixing times. After all components of the OBM were added, the resultant fluid was mixed at 7000 rpm until the fluid's temperature reached 135° F. The base fluid initial rheology and electrical stability were determined. An aliquot of the base fluid (1 BEQ) with the indicated additive was mixed for 10 minutes on a 2-speed mixer before the fluid's initial rheology and electrical stability were determined. A barrel equivalent (BEQ) represents a laboratory barrel, which is approximately 350 mls based on conversion factors. Additive amounts expressed in lbs/bbl are equal in concentration to g/BEQ (i.e. g/350 mL). The sample was then hot rolled for 16 hours at 300° F., followed by mixing for 5 minutes and determination of the HTHP fluid loss properties. The HTHP fluid loss on filter paper was determined as previously disclosed herein on 20 micron aloxite disks which had been saturated with an oleaginous fluid for a minimum of 16 hours.

Example 1

The properties of a wellbore treatment fluid comprising a ground sulfonated asphalt, both of the type disclosed herein were investigated. The composition of an OBM used as the base fluid, designated Fluid #1, in the following examples is presented in Table 1.

TABLE 1

Components of Fluid #1

| Fluid Components | Units | Fluid #1 | Mixing Time (min.) |
|---|---|---|---|
| Volume | bbl eqv | 1.076 | |
| ESCAID 110 hydrocarbon fluid | bbl | 0.609 | — |
| Organophillic Clay | ppb | 4.92 | 5 |
| Lime | ppb | 3.25 | 5 |
| Emulsifier | ppb | 6.5 | 5 |
| Wetting Agent | ppb | 3.25 | 5 |
| Tap Water | bbl | 0.149 | 10 |
| $CaCl_2$ | ppb | 21.7 | — |
| Uintaite | ppb | 6.5 | 5 |
| Barite | ppb | 290.73 | 5 |
| Montmorillonite Clay | ppb | 16.9 | 5 |

The emulsifier used in the base mud was VERSACOAT NA available from Mi Swaco (a Schlumberger company); the wetting agent used was VERSAWET, also available from Mi Swaco. Uintaite is a natural asphalt mineral, and barite is a mineral of barium sulfate. Various properties of Fluid #1 were determined and these results are presented in Table 2. ESCAID 110 hydrocarbon fluid is a petroleum distillate commercially available from EXXON-MOBIL Corp.

TABLE 2

Properties of Fluid #1

| Sample | Units | Fluid #1 | Fluid #1 | Fluid #1 | Fluid #1 |
|---|---|---|---|---|---|
| Fluid Aged | | Initial | Dynamic | Initial | Dynamic |
| Fluid Aged | hrs | — | 16 | — | 16 |
| Temp. Aged, ° F. | ° F. | — | 300 | — | 300 |
| Density | ppg | 14.0 | 14.0 | 14.0 | 14.0 |
| Rheology Measured | ° F. | 120 | 120 | 150 | 150 |
| 600 rpm | Dial Reading | 80 | 85 | 64 | 64 |
| 300 rpm | Dial Reading | 49 | 48 | 39 | 36 |
| 200 rpm | Dial Reading | 38 | 36 | 31 | 27 |
| 100 rpm | Dial Reading | 26 | 22 | 21 | 17 |
| 6 rpm | Dial Reading | 10 | 6 | 8 | 5 |
| 3 rpm | Dial Reading | 9 | 5 | 7 | 4 |
| Gel Strengths (10 sec/10 min/30 min) | $lb_f/100\,ft^2$ | 12/18/21 | 10/27/34 | 10/15/17 | 7/18/21 |
| Apparent Viscosity | cPs | 40 | 42.5 | 32 | 32 |
| Plastic Viscosity | cPs | 31 | 37 | 25 | 28 |
| Yield Point | $lb_f/100\,ft^2$ | 18 | 11 | 14 | 8 |
| Electrical Stability @ 120° F./150° F. | volts | 863 | 793 | 820 | 792 |
| HTHP Fluid Loss | ° F. | — | 300 | — | 300 |
| Delta Pressure | psi | — | 500 | — | 500 |
| Spurt Loss | ml | — | — | — | 0.2 |
| | ml/30 min. | — | 1.35 | — | 1.25 |
| HTHP F.L. value | ml × 2 | — | 2.7 | — | 2.9 |
| Filtercake Thickness | mm | — | 2.51 | — | 1.25 |

Referring to Table 2, the rheological properties of Fluid #1 were measured using a coaxial cylinder rotational (FANN 35 style) viscometer at 3, 6, 100, 200, 300, and 600 RPM. The viscosity spring deflection of a standard bob and sleeve at each mixing speed, plastic viscosity (centipoise), and yield point (lbs/100 $ft^2$) of Fluid #1 were measured in accordance with API Recommended Practices 10B, Bingham Plastic Model. The electrical stability refers to a measure of invert emulsion stability and may be measured in accordance with API 13B-2 (2005); the apparent viscosity refers to a rheological property of the fluid; the delta pressure refers to the pressure exerted on the fluid during the fluid loss test and may be measured in accordance with API 13B-2 (2005); and the spurt loss refers to the initial fluid loss that occurs while the filter cake is forming and may be measured in accordance with a field test method. The results provide information on the initial fluid flow into the formation prior to filter cake formation.

A second fluid was prepared that contained the base mud (i.e., Fluid #1) and 6.0 ppb of sulfonated asphalt in the sodium salt form (SOLTEX E). SOLTEX E additive is a sodium asphalt sulfate commercially available from Chevron Phillips Chemical. The components of this second fluid, designated Fluid #2, are presented in Table 3. The fluid properties were measured as described for Fluid #1 and these results are presented in Table 4.

TABLE 3

Components of Fluid #2

| Fluid Components | Units | Fluid #2 |
|---|---|---|
| Volume | bbl eqv | 1.0 |
| Base Field Mud (Fluid #1) | bbl | 0.985 |
| Sulfonated Asphalt | ppb | 6.0 |

TABLE 4

Properties of Fluid #2

| Sample | Units | Fluid #2 | Fluid #2 | Fluid #2 | Fluid #2 |
|---|---|---|---|---|---|
| Fluids Aged | | Initial | Dynamic | Initial | Dynamic |
| Fluids Aged | hrs | — | 16 | — | 16 |
| Temp. Aged, °F. | °F. | — | 300 | — | 300 |
| Density | ppg | 14.0 | 14.0 | 14.0 | 14.0 |
| Rheology Measured | °F. | 120 | 120 | 150 | 150 |
| 600 rpm | Dial reading | 85 | 106 | 68 | 74 |
| 300 rpm | Dial reading | 52 | 61 | 41 | 42 |
| 200 rpm | Dial reading | 40 | 44 | 33 | 30 |
| 100 rpm | Dial reading | 27 | 26 | 23 | 18 |
| 6 rpm | Dial reading | 10 | 5 | 8 | 3 |
| 3 rpm | Dial reading | 9 | 3 | 7 | 2 |
| Gel Strengths (10 sec/10 min/30 min) | $lb_f/100\ ft^2$ | 12/20/23 | 5/23/31 | 10/16/18 | 3/16/22 |
| Apparent Viscosity | cPs | 42.5 | 53 | 34 | 37 |
| Plastic Viscosity | cPs | 33 | 45 | 27 | 32 |
| Yield Point | $lb_f/100\ ft^2$ | 19 | 16 | 14 | 10 |
| Electrical Stability @ 120°F./150°F. | volts | 781 | 664 | 694 | 606 |
| HTHP Fluid Loss | °F. | — | — | — | 300 |
| Delta Pressure | psi | — | 500 | — | 500 |
| Spurt Loss | ml | — | — | — | 0.1 |
| | ml/30 min. | — | 1.95 | — | 1.1 |
| HTHP F.L. value | ml × 2 | — | 1.9 | — | 2.4 |
| Filtercake Thickness | mm | — | 2.12 | — | 1.38 |

A third fluid was prepared that contained the base mud (i.e., Fluid #1) and 6.0 ppb of ground sulfonated asphalt in the sodium salt form (SOLTEX E) that had a particle size predominantly less than 100 mesh, as shown in FIG. 1. The components of this third fluid, designated Fluid #3, are presented in Table 5. The fluid properties were measured as described for Fluid #1 and these results are presented in Table 6.

TABLE 5

Components of Fluid #3

| Fluid Components | Units | Fluid #3 |
|---|---|---|
| Volume | bbl eqv | 1.0 |
| Base Field Mud (Fluid #1) | bbl | 0.985 |
| Ground Sulfonated Asphalt | ppb | 6.0 |

TABLE 6

Properties of Fluid #3

| Sample | Units | Fluid #3 | Fluid #3 | Fluid #3 | Fluid #3 |
|---|---|---|---|---|---|
| Fluids Aged | | Initial | Dynamic | Initial | Dynamic |
| Fluids Aged | hrs | — | 16 | — | 16 |
| Temp. Aged, °F. | °F. | — | 300 | — | 300 |
| Density | ppg | 14.0 | 14.0 | 14.0 | 14.0 |
| Rheology Measured | °F. | 120 | 120 | 150 | 150 |
| 600 rpm | Dial reading | 88 | 113 | 69 | 81 |
| 300 rpm | Dial reading | 53 | 64 | 41 | 45 |
| 200 rpm | Dial reading | 40 | 47 | 31 | 33 |
| 100 rpm | Dial reading | 26 | 27 | 21 | 19 |
| 6 rpm | Dial reading | 8 | 4 | 7 | 3 |
| 3 rpm | Dial reading | 6 | 3 | 5 | 2 |
| Gel Strengths (10 sec/10 min/30 min) | $lb_f/100\ ft^2$ | 11/18/21 | 5/24/35 | 9/16/18 | 4/19/26 |
| Apparent Viscosity | cPs | 44 | 56.5 | 34.5 | 40.5 |
| Plastic Viscosity | cPs | 35 | 49 | 28 | 36 |
| Yield Point | $lb_f/100\ ft^2$ | 18 | 15 | 13 | 9 |
| Electrical Stability @ 120°F./150°F. | volts | 929 | 842 | 873 | 792 |
| HTHP Fluid Loss | °F. | — | 300 | — | 300 |
| Delta Pressure | psi | — | 500 | — | 500 |
| Spurt Loss | ml | — | — | — | 0.05 |
| | ml/30 min. | — | 1.1 | — | 0.4 |
| HTHP F.L. value | ml × 2 | — | 2.2 | — | 0.9 |
| Filtercake Thickness | mm | — | 1.81 | — | 1.3 |

The particle size distribution for the sulfonated asphalt particles was determined using a Beckman Coulter LS 13 320 LS Particle Size Analyzer. The D90, D50 and D10 values were measured for both the sulfonated asphalt utilized in Fluid #2 and the ground sulfonated asphalt utilized in Fluid #3. The comparison of particle size for Fluid #2 and Fluid #3 is shown in Table 7. The complete particle size distribution for the ground sulfonated asphalt particles is shown in FIG. 1. A comparison of the various properties of Fluid #1, Fluid #2, and Fluid #3 is presented in Table 8.

TABLE 7

Particle Size Distribution of Sulfonated Asphalt

| | D-90, µm | D-50, µm | D-10, µm |
|---|---|---|---|
| Fluid #2 - Sulfonated Asphalt | 646.2 | 330.8 | 80.31 |
| Fluid #3 - Ground Sulfonated Asphalt (<100 mesh) | 74.87 | 15.63 | 2.41 |

TABLE 8

Comparison of Properties for Fluids #1, #2 and #3

| Sample | | Fluid #1 | Fluid #2 | Fluid #3 |
|---|---|---|---|---|
| HTHP Fluid Loss | °F. | 300 | 300 | 300 |
| Disk Size | µm | 20 | 20 | 20 |
| Spurt Loss | ml | 0.2 | 0.1 | 0.5 |
| HTHP Fluid Loss value | ml × 2 | 2.9 | 2.4 | 0.9 |
| % < Base Mud HTHP Fluid Loss | | — | 17.2 | 68.9 |

TABLE 8-continued

Comparison of Properties for Fluids #1, #2 and #3

| Sample | | Fluid #1 | Fluid #2 | Fluid #3 |
|---|---|---|---|---|
| Filtercake Thickness | mm | 1.25 | 1.38 | 1.3 |
| Electrical Stability @ 150° F. | volts | 792 | 606 | 793 |
| Rheology | ° F. | 150 | 150 | 150 |
| Yield Point | lb$_f$/100 ft$^2$ | 8 | 10 | 9 |
| 6 rpm | Dial reading | 5 | 3 | 3 |
| 3 rpm | Dial reading | 4 | 2 | 2 |
| Gel Strengths, (10 sec/10 min/30 min) | lb$_f$/100 ft$^2$ | 7/18/21 | 3/16/22 | 4/19/26 |

Example 2

The properties of a wellbore treatment fluid comprising a ground sulfonated asphalt, of the type disclosed herein, were investigated. Fluid #4 is a drilling fluid obtained from the field (i.e. a well being drilled), therefore, the exact composition is unknown. The drilling fluid was provided by Baroid, a division of Halliburton. Fluid #4 also contained diesel fluid as the oleaginous component and was used as the OBM for Fluids #5 and #6.

The base fluid (Fluid #4) had an OWR of 81:19. The properties of the base fluid are presented in Table 9. No solids settling was observed after the 30 minute gel tests, indicating that Fluid #4 behaves as a suitable drilling fluid.

TABLE 9

Properties of Fluid #4

| Sample | Units | Fluid #4 | Fluid #4 |
|---|---|---|---|
| Fluids Aged | | Initial | Dynamic |
| Fluids Aged | hrs | — | 16 |
| Temp. Aged, ° F. | ° F. | — | 300 |
| Density | ppg | 12.7 | 12.7 |
| Rheology Measured | ° F. | 150 | 150 |
| 600 rpm | Dial reading | 79 | 85 |
| 300 rpm | Dial reading | 46 | 49 |
| 200 rpm | Dial reading | 34 | 39 |
| 100 rpm | Dial reading | 21 | 23 |
| 6 rpm | Dial reading | 6 | 6 |
| 3 rpm | Dial reading | 5 | 5 |
| Gel Strengths (10 sec/10 min/30 min) | lb$_f$/100 ft$^2$ | 9/22/27 | 10/30/37 |
| Apparent Viscosity | cPs | 39.5 | 42.5 |
| Plastic Viscosity | cPs | 33 | 36 |
| Yield Point | lb$_f$/100 ft$^2$ | 13 | 13 |
| Electrical Stability @ 150° F. | volts | 678 | 696 |
| Solids | vol. % | 27.5 | 27.5 |
| Water | vol. % | 13.5 | 13.5 |
| Oil | vol. % | 59.0 | 59.0 |
| HTHP Fluid Loss | ° F. | 300 | 300 |
| Delta Pressure | psi | 500 | 500 |
| | ml/30 min. | 4.7 | 4.5 |
| HTHP F.L. value | ml × 2 | 9.4 | 9.0 |
| Filtercake Thickness | mm | 4.7 | 3.95 |

Fluid #5 and Fluid #6 comprised Fluid #4 as well as sulfonated asphalt. Fluid #5 was prepared by adding to the base fluid (i.e., Fluid #4) 6.0 ppb of a ground sulfonated asphalt compound in the sodium salt form (SOLTEX E) of the type disclosed herein. As shown in FIG. 1, the particle size of the ground sulfonated asphalt was predominantly less than 100 mesh. The composition and various properties of Fluid #5 are presented in Tables 10 and 11.

TABLE 10

Components of Fluid #5

| Fluid Components | Units | Fluid #5 |
|---|---|---|
| Volume | bbl eqv | 1.0 |
| Base Field Mud (Fluid #1) | bbl | 0.985 |
| Ground Sulfonated Asphalt | ppb | 6.0 |

TABLE 11

Properties of Fluid #5

| Sample | Units | Fluid #5 | Fluid #5 |
|---|---|---|---|
| Fluids Aged | | Initial | Dynamic |
| Fluids Aged | hrs | — | 16 |
| Temp. Aged, ° F. | ° F. | — | 300 |
| Density | ppg | 12.7 | 12.7 |
| Rheology Measured | ° F. | 150 | 150 |
| 600 rpm | Dial reading | 86 | 104 |
| 300 rpm | Dial reading | 48 | 59 |
| 200 rpm | Dial reading | 34 | 43 |
| 100 rpm | Dial reading | 20 | 25 |
| 6 rpm | Dial reading | 4 | 5 |
| 3 rpm | Dial reading | 3 | 4 |
| Gel Strengths (10 sec/10 min/30 min) | lb$_f$/100 ft$^2$ | 6/18/23 | 8/50/65 |
| Apparent Viscosity | cPs | 43 | 52 |
| Plastic Viscosity | cPs | 38 | 45 |
| Yield Point | lb$_f$/100 ft$^2$ | 10 | 14 |
| Electrical Stability @ 150° F. | volts | 624 | 782 |
| Oil/Water Ratio | | 81/19 | 81/19 |
| HTHP Fluid Loss | ° F. | — | 300 |
| Delta Pressure | psi | — | 500 |
| | ml/30 min. | — | 1.35 |
| HTHP F.L. value | ml × 2 | — | 2.7 |
| Filtercake Thickness | mm | — | 2.53 |

Fluid #6 was prepared by adding 6.0 ppb of sulfonated asphalt (SOLTEX E) to the OBM (i.e., Fluid #4). The composition of and various properties of Fluid #6 are provided in Tables 12 and 13.

TABLE 12

Components of Fluid #6

| Fluid Components | Units | Fluid #3 |
|---|---|---|
| Volume | bbl eqv | 1.0 |
| Base Field Mud (Fluid #1) | bbl | 0.985 |
| Sulfonated Asphalt | ppb | 6.0 |

TABLE 13

Properties of Fluid #6

| Sample | Units | Fluid #6 | Fluid #6 |
|---|---|---|---|
| Fluids Aged | | Initial | Dynamic |
| Fluids Aged | hrs | — | 16 |
| Temp. Aged, ° F. | ° F. | — | 300 |
| Density | ppg | 12.7 | 12.7 |
| Rheology Measured | ° F. | 150 | 150 |
| 600 rpm | Dial reading | 80 | 93 |
| 300 rpm | Dial reading | 47 | 52 |
| 200 rpm | Dial reading | 35 | 37 |
| 100 rpm | Dial reading | 22 | 22 |
| 6 rpm | Dial reading | 6 | 5 |
| 3 rpm | Dial reading | 4 | 3 |

TABLE 13-continued

Properties of Fluid #6

| Sample | Units | Fluid #6 | Fluid #6 |
|---|---|---|---|
| Gel Strengths (10 sec/10 min/30 min) | lb$_f$/100 ft$^2$ | 8/21/25 | 6/26/37 |
| Apparent Viscosity | cPs | 40 | 46.5 |
| Plastic Viscosity | cPs | 33 | 41 |
| Yield Point | lb$_f$/100 ft$^2$ | 14 | 11 |
| Electrical Stability @ 150° F. | volts | 831 | 697 |
| HTHP Fluid Loss | ° F. | — | 300 |
| Delta Pressure | psi | — | 500 |
|  | ml/30 min. | — | 4.2 |
| HTHP F.L. value | ml × 2 | — | 8.4 |
| Filtercake Thickness | mm | — | 4.98 |

The particle size distribution for the sulfonated asphalt particles was determined using a Beckman Coulter LS 13 320 LS article Size Analyzer. The D90, D50 and D10 values were measured for both the sulfonated asphalt utilized in Fluid #5 and the GSA utilized in Fluid #6. The comparison of particle size for Fluid #5 and Fluid #6 is shown in Table 14. The complete particle size distribution for the ground sulfonated asphalt particles is shown in FIG. 1. A comparison of various properties of the Fluid #4, Fluid #5, and Fluid #6 is presented in Table 15.

TABLE 14

Particle Size Distribution of Sulfonated Asphalt

|  | D-90, μm | D-50, μm | D-10, μm |
|---|---|---|---|
| Fluid #6 - Sulfonated Asphalt | 491.60 | 198.20 | 46.59 |
| Fluid #5 - Ground Sulfonated Asphalt (<100 mesh) | 74.87 | 15.63 | 2.41 |

TABLE 15

Comparison of Properties for Fluids #4, #5, and #6

| Sample |  | Fluid #4 | Fluid #5 | Fluid #6 |
|---|---|---|---|---|
| HTHP Fluid Loss | ° F. | 300 | 300 | 300 |
| HTHP Fluid Loss value | ml × 2 | 9.0 | 2.7 | 8.4 |
| % < Base Mud HTHP Fluid Loss |  | — | 70.0 | 6.67 |
| Filtercake Thickness | mm | 3.95 | 2.53 | 4.98 |
| Electrical Stability @ 150° F. | volts | 696 | 782 | 697 |
| Yield Point | lb$_f$/100 ft$^2$ | 13 | 14 | 11 |
| 6 | rpm | 6 | 5 | 5 |
| 3 | rpm | 5 | 4 | 3 |
| Gel Strengths, (10 sec/10 min/30 min) | lb$_f$/100 ft$^2$ | 10/30/37 | 8/50/65 | 6/26/37 |

Additional Disclosure

The following enumerated embodiments are provided as non-limiting examples.

A first embodiment which is an additive for a wellbore treatment fluid comprising a sulfonated asphalt compound comprising particles having a D90 particle size of less than about 215 μm.

A second embodiment which is the additive of the first embodiment wherein equal to or greater than about 95% of the particles pass through a 70 mesh sieve.

A third embodiment which is the additive of any of the first through second embodiments wherein equal to or greater than about 95% of the particles pass through a 100 mesh sieve.

A fourth embodiment which is the additive of any of the first through third embodiments wherein equal to or greater than about 95% of the particles pass through a 170 mesh sieve.

A fifth embodiment which is the additive of any of the first through fourth embodiments wherein the sulfonated asphalt comprises one or more compounds selected from the group consisting of an ammonium salt, an alkali metal salt, and an alkaline earth metal salt.

A sixth embodiment which is the additive of any of the first through fifth embodiments wherein the sulfonated asphalt comprises a sodium salt of a sulfonated asphalt.

A seventh embodiment which is the additive of any of the first through sixth embodiments wherein the sulfonated asphalt comprises a potassium salt of a sulfonated asphalt.

An eighth embodiment which is a wellbore treatment fluid comprising (i) an oleaginous component and (ii) a sulfonated asphalt, wherein the sulfonated asphalt comprises particles having a D90 of less than about 215 μm.

A ninth embodiment which is the wellbore treatment fluid of the eighth embodiment wherein equal to or greater than about 95% of the sulfonated asphalt particles pass through a 70 mesh sieve.

A tenth embodiment which is the wellbore treatment fluid of any of the eighth through ninth embodiments wherein equal to or greater than about 95% of the sulfonated asphalt particles pass through a 100 mesh sieve.

An eleventh embodiment which is the wellbore treatment fluid of any of the eighth through tenth embodiments wherein equal to or greater than about 95% of the sulfonated asphalt particles pass through a 170 mesh sieve.

A twelfth embodiment which is the wellbore treatment fluid of any of the eighth through tenth embodiments wherein the sulfonated asphalt comprises one or more components selected from the group consisting of a free acid, an ammonium salt, an alkali metal salt, and an alkaline earth metal salt.

A thirteenth embodiment which is the wellbore treatment fluid of any of the eighth through twelfth embodiments wherein the sulfonated asphalt comprises a sodium salt of a sulfonated asphalt.

A fourteenth embodiment which is the wellbore treatment fluid of any of the eighth through thirteenth embodiments wherein the sulfonated asphalt comprises a potassium salt of a sulfonated asphalt.

A fifteenth embodiment which is the wellbore treatment fluid of any of the eighth through fourteenth embodiments comprising one or more oleaginous components selected from the group consisting of diesel oil, mineral oil, a synthetic oil, kerosene, fuel oil, crude oil, and derivatives thereof.

A sixteenth embodiment which is the wellbore treatment fluid of any of the eighth through fifteenth embodiments wherein the oleaginous component comprises an olefin.

A seventeenth embodiment which is the wellbore treatment fluid of any of the eighth through sixteenth embodiments wherein the oleaginous component comprises an organic ester.

An eighteenth embodiment which is the wellbore treatment fluid of any of the eighth through seventeenth embodiments wherein the oleaginous component comprises one or more oleaginous components selected from the group consisting of a linear and a branched paraffin.

A nineteenth embodiment which is the wellbore treatment fluid of any of the eighth through eighteenth embodiments wherein the oleaginous component comprises an acetal.

A twentieth embodiment which is the wellbore treatment fluid of any of the eighth through nineteenth embodiments wherein the sulfonated asphalt is present at a concentration less than or equal to about 15 ppb.

A twenty-first embodiment which is the wellbore treatment fluid of any of the eighth through twentieth embodiments wherein the oleaginous component is present in the wellbore servicing fluid in an amount greater than or equal to about 70% by volume.

A twenty-second embodiment which is a method comprising introducing a wellbore treatment fluid comprising an oleaginous component, a non-oleaginous component, and a sulfonated asphalt wherein the sulfonated asphalt comprises particles having a D90 of less than about 215 μm.

A twenty-third embodiment which is the method of the twenty-second embodiment wherein equal to or greater than about 95% of the sulfonated asphalt particles pass through a 70 mesh sieve.

A twenty-fourth embodiment which is the method of any of the twenty-second through twenty-third embodiments wherein equal to or greater than about 95% of the sulfonated asphalt particles pass through a 100 mesh sieve.

A twenty-fifth embodiment which is the method of any of the twenty-second through twenty-fourth embodiments wherein equal to or greater than about 95% of the sulfonated asphalt particles pass through a 170 mesh sieve.

A twenty-sixth embodiment which is the method of any of the twenty-second through twenty-fifth embodiments wherein a filtercake formed from the wellbore treatment fluid has a thickness that is at least 20% less than the thickness of the filtercake formed from a wellbore treatment fluid that does not comprise sulfonated asphalt.

A twenty-seventh embodiment which is the method of any of the twenty-second through twenty-fifth embodiments wherein the sulfonated asphalt is present in an amount less than or equal to about 15 ppb.

A twenty-eighth embodiment which is the wellbore treatment fluid of the eighth embodiment wherein the wellbore treatment fluid is formulated as an invert emulsion drilling fluid.

Figure 2:
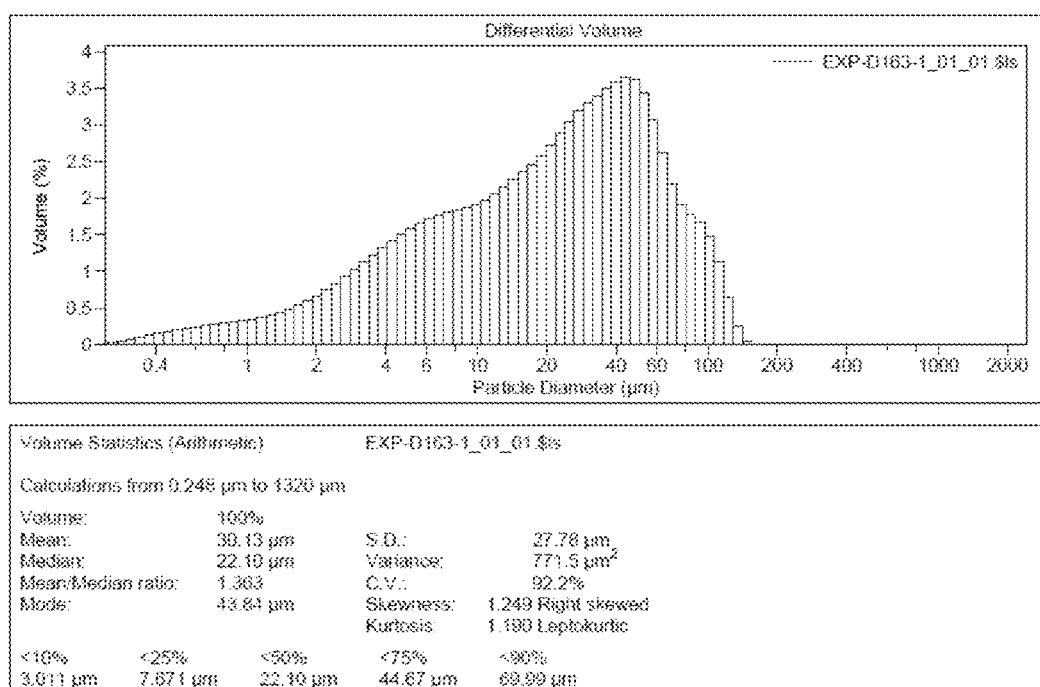
FIGS. 2 and 3 show alternative D90, D50, and D10 particle size distributions in accordance with various embodiments of the present disclosure.
Figure 3:
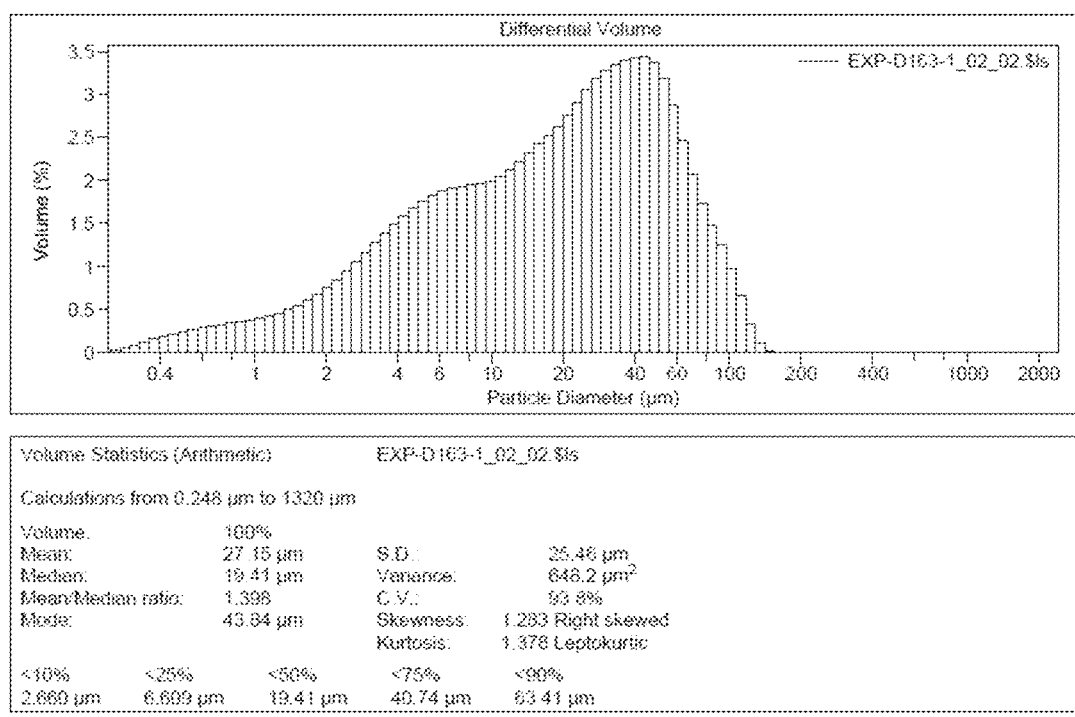

Without further elaboration, it is believed that one skilled in the art can, using the description herein, utilize the present invention to its fullest extent. While preferred inventive aspects have been shown and described, modifications thereof can be made by one skilled in the art without departing from the spirit and teachings of the invention. The embodiments and examples described herein are exemplary only, and are not intended to be limiting. Many variations and modifications of the invention disclosed herein are possible and are within the scope of the invention. For example, although FIG. 1 shows the particle size distribution used in the Examples, other particle size distributions may be used in accordance with various embodiments of the present disclosure. Non-limiting examples of such variations in particle size distribution are provided in FIGS. 2 and 3. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent that they provide exemplary, procedural or other details supplementary to those set forth herein.

What is claimed is:

1. An additive for an oil-based wellbore treatment fluid, the additive comprising:
    a ground sulfonated asphalt compound comprising particles having a D10, D50 and D90 particle size distribution as determined by standard particle size measurements wherein:
    the D10 particle size is less than about 30 μm,
    the D50 particle size is less than about 50 μm, and
    the D90 particle size is less than about 215 μm;
    wherein the ground sulfonated asphalt is included in the wellbore treatment fluid in an amount of from about 0.1 lbs/bbl to about 15 lbs/bbl,
    such that the wellbore treatment fluid with the additive has a yield point (YP) of from about 1 lb/100 ft$^2$ to about 50 lb/100 ft$^2$.

2. The additive of claim 1 wherein equal to or greater than about 95% of the particles pass through a 70 mesh sieve.

3. The additive of claim 1 wherein equal to or greater than about 95% of the particles pass through a 100 mesh sieve.

4. The additive of claim 1 wherein equal to or greater than about 95% of the particles pass through a 170 mesh sieve.

5. The additive of claim 1 wherein the sulfonated asphalt comprises one or more compounds selected from the group consisting of an ammonium salt, an alkali metal salt, and an alkaline earth metal salt.

6. The additive of claim 1 wherein the sulfonated asphalt comprises a sodium salt of a sulfonated asphalt.

7. The additive of claim 1 wherein the sulfonated asphalt comprises a potassium salt of a sulfonated asphalt.

8. A wellbore treatment fluid comprising:
    (i) an oleaginous component, and
    (ii) a ground sulfonated asphalt,
    wherein the sulfonated asphalt comprises particles having a D10, D50 and D90 particle size distribution as determined by standard particle size measurements wherein:
    the D10 particle size is less than about 30 μm,
    the D50 particle size is less than about 50 μm, and
    the D90 particle size is less than about 215 μm,
    wherein the ground sulfonated asphalt is included in the wellbore treatment fluid in an amount of from about 0.1 lbs/bbl to about 15 lbs/bbl and the wellbore
    treatment fluid has a yield point (YP) of from about 1 lb/100 ft$^2$ to about 50 lb/100 ft$^2$.

9. The wellbore treatment fluid of claim 8 wherein equal to or greater than about 95% of the sulfonated asphalt particles pass through a 70 mesh sieve.

10. The wellbore treatment fluid of claim 8 wherein equal to or greater than about 95% of the sulfonated asphalt particles pass through a 100 mesh sieve.

11. The wellbore treatment fluid of claim 8 wherein equal to or greater than about 95% of the sulfonated asphalt particles pass through a 170 mesh sieve.

12. The wellbore treatment fluid of claim 8 wherein the sulfonated asphalt comprises one or more components selected from the group consisting of a free acid, an ammonium salt, an alkali metal salt, and an alkaline earth metal salt.

13. The wellbore treatment fluid of claim 8 wherein the sulfonated asphalt comprises a sodium salt of a sulfonated asphalt.

14. The wellbore treatment fluid of claim 8 wherein the sulfonated asphalt comprises a potassium salt of a sulfonated asphalt.

15. The wellbore treatment fluid of claim 8 comprising one or more oleaginous components selected from the group consisting of diesel oil, mineral oil, a synthetic oil, kerosene, fuel oil, crude oil, and derivatives thereof.

16. The wellbore treatment fluid of claim 8 wherein the oleaginous component comprises an olefin.

17. The wellbore treatment fluid of claim 8 wherein the oleaginous component comprises an organic ester.

18. The wellbore treatment fluid of claim 8 wherein the oleaginous component comprises one or more oleaginous components selected from the group consisting of a linear and a branched paraffin.

19. The wellbore treatment fluid of claim 8 wherein the oleaginous component comprises an acetal.

20. The wellbore treatment fluid of claim 8 wherein the sulfonated asphalt is present at a concentration less than or equal to about 15 ppb.

21. The wellbore treatment fluid of claim 8 wherein the oleaginous component is present in the wellbore servicing fluid in an amount greater than or equal to about 70% by volume.

22. The wellbore treatment fluid of claim 8 formulated as an invert emulsion drilling fluid.

23. The wellbore treatment fluid of claim 8, wherein the wellbore treatment fluid with the additive has a high-temperature high-pressure (HTHP) fluid loss at 300° F. that is decreased by from about 10% to about 90% when compared to the HTHP fluid loss of the wellbore treatment fluid in the absence of an additive.

24. The wellbore treatment fluid of claim 8, wherein the wellbore treatment fluid is characterized by a plastic viscosity ranging from about 1 cPs to about 75 cPs and a yield point ranging from about 2 lb/100 ft$^2$ to about 25 lb/100 ft$^2$.

25. The additive of claim 1 wherein the ground sulfonated asphalt has a ring and ball softening point in the range of from about 115° F. to about 475° F.

26. The wellbore treatment fluid of claim 8 wherein the ground sulfonated asphalt has a ring and ball softening point in the range of from about 1.15° F. to about 475° F.

* * * * *